United States Patent
Hermanson

[11] Patent Number: 5,581,284
[45] Date of Patent: Dec. 3, 1996

[54] METHOD OF EXTENDING THE LIFE OF A PRINTBAR OF A COLOR INK JET PRINTER

[75] Inventor: Herman A. Hermanson, Penfield, N.Y.

[73] Assignee: Xerox Corporation, Stamford, Conn.

[21] Appl. No.: 344,913

[22] Filed: Nov. 25, 1994

[51] Int. Cl.⁶ .................. B41J 2/21; B41J 2/15; B41J 2/145
[52] U.S. Cl. .................................... 347/43; 347/40
[58] Field of Search ..................... 347/40, 41, 43, 347/37

[56] References Cited

U.S. PATENT DOCUMENTS

| | | | |
|---|---|---|---|
| 4,774,530 | 9/1988 | Hawkins | 346/140 R |
| 4,929,324 | 5/1990 | Watanabe et al. | 204/206 |
| 4,963,882 | 10/1990 | Hickman | 347/41 |
| 5,057,852 | 10/1991 | Formica et al. | 347/43 |
| 5,072,235 | 12/1991 | Slowik | 346/1.1 |
| 5,192,929 | 3/1993 | Walker et al. | 340/444 |
| 5,192,959 | 3/1993 | Drake et al. | 346/140 R |
| 5,198,054 | 3/1993 | Drake et al. | 156/64 |
| 5,430,469 | 7/1995 | Shioya et al. | 347/15 |

*Primary Examiner*—Benjamin R. Fuller
*Assistant Examiner*—Thinh Nguyen

[57] ABSTRACT

A method of extending the useful life of a printbar for black ink in a multi-color printbar, full width array color ink jet printer by checking each nozzle in the printbar for droplet ejection; identifying any nozzle which fails to eject a droplet as a problem nozzle, and substituting at least one droplet from a nozzle in another printbar having a different color of ink. The substitute fill-in with a cyan droplet, cyan and magenta droplets, or cyan, magenta, and yellow droplets for process black prevents a missing spot and provides adequate printing quality for black printing, such as, for text, so that immediate printbar replacement is avoided, thereby extending the printbar life.

8 Claims, 4 Drawing Sheets

METHOD OF EXTENDING THE LIFE OF A PRINTBAR OF A COLOR INK JET PRINTER

BACKGROUND OF THE INVENTION

This invention relates to full width array, multicolor thermal ink jet printers, and more particularly, to a method of extending the life of a printbar in a four printbar, full width array color ink jet printer, by sensing problem nozzles which fail to eject ink droplets and by filling in the missing droplets with ink droplets of a different color ink from one of the other printbars.

It is well known in the reading and/or writing bar industry to assemble pagewidth or full width array raster input scanning (RIS) bars and raster output scanning (ROS) bars from relatively short RIS/ROS subunits placed end-to-end on a structural support bar. Once assembled, the full width array RIS/ROS bars have the requisite length and number of image processing elements to scan or to write an entire line of information with a high image resolution. Image writing bars such as thermal ink jet printbars have a plurality of printhead subunits mounted end-to-end on a structural bar which also serves as a heat sink and may optionally be cooled by passing a liquid therethrough, such as water.

Each thermal ink jet printhead subunit uses thermal energy selectively produced by resistors located in capillary filled ink channels near nozzles or orifices to vaporize momentarily the ink and form vapor bubbles on demand. Each temporary bubble expels an ink droplet and propels it towards a recording medium, such as, paper. The use of an array of printhead subunits is appropriate because full width array printheads cannot be practically fabricated on a single wafer. Full width array printbars may be composed of collinear arrays of printhead subunits or stagged printhead subunits on each side of a structural support bar and offset from one another.

Because full width array printbars composed of collinear arrays of printhead subunits have a number of architectural advantages over staggered offset printbar architectures, this is the configuration used in describing the present invention, though either printbar configuration could be used equally well. One convenient method of fabricating a collinear full width array printbar for an ink jet printer is to butt each printhead subunit against its neighboring printhead subunit. This fabrication method provides very positive positioning of the printhead subunits and minimizes the nozzle gap between adjacent printhead subunits. For such a fabrication method which prevents tolerance stackup, refer to U.S. Pat. No. 5,198,054 to Drake et al.

U.S. Pat. No. 5,192,929 to Drake et al. discloses a means to install full width array printbars into an ink jet printer with the appropriate accuracy to enable alignment of the nozzles of one printbar with the nozzles of other printbars. For multi-color, full width array printers, this is essential because one droplet of one color ejected from one of the printbars must land directly on top of a droplet of a different color ejected from a different printbar.

For a full width array thermal ink jet printbar having 300 nozzles per inch, 2550 total nozzles are required for a recording medium eight and a half inches wide. Statistical variation in resistors or heating elements and their associated ink channels for this quantity of droplet ejecting nozzles clearly predicts that a small number of nozzles will fail to eject droplets long before the other nozzles. As soon as one nozzle fails to eject a droplet, a white line appears in the printed image on the recording medium. This is because the fixed, full width array printbars extend across the recording medium and the recording medium moves therepast at a constant velocity in a direction perpendicular to the linear array of nozzles. For high quality printing, a full width array printbar with one bad or non-droplet ejecting nozzle must be replaced. This invention enables the continued use of printbars with one or more malfunctioning nozzles.

SUMMARY OF THE INVENTION

An object of the present invention is to extend the useful life of a full width array, thermal ink jet printbar even though one or more nozzles malfunction and fail to eject ink droplets.

In the present invention, a method of extending the useful life of a printbar, such as, for example, for black ink in a multi-color printbar, full width array color ink jet printer by checking each nozzle in the printbar for droplet ejection; identifying any nozzle which fails to eject a droplet as a problem nozzle, and substituting at least one droplet from a nozzle in another printbar having a different color of ink. The substitute fill-in with a cyan droplet, cyan and magenta droplets, or cyan, magenta, and yellow droplets for process black prevents a missing spot and provides adequate printing quality for black printing, such as, for text, so that immediate printbar replacement is avoided, thereby extending the printbar life. Conversely, black ink may be used to fill in for missing cyan droplets or magenta droplets.

A more complete understanding of the present invention can be obtained by considering the following detailed description of the invention in conjunction with the accompanying drawings, wherein like index numerals indicate like parts.

DESCRIPTION OF THE PREFERRED EMBODIMENT

Figure 1:
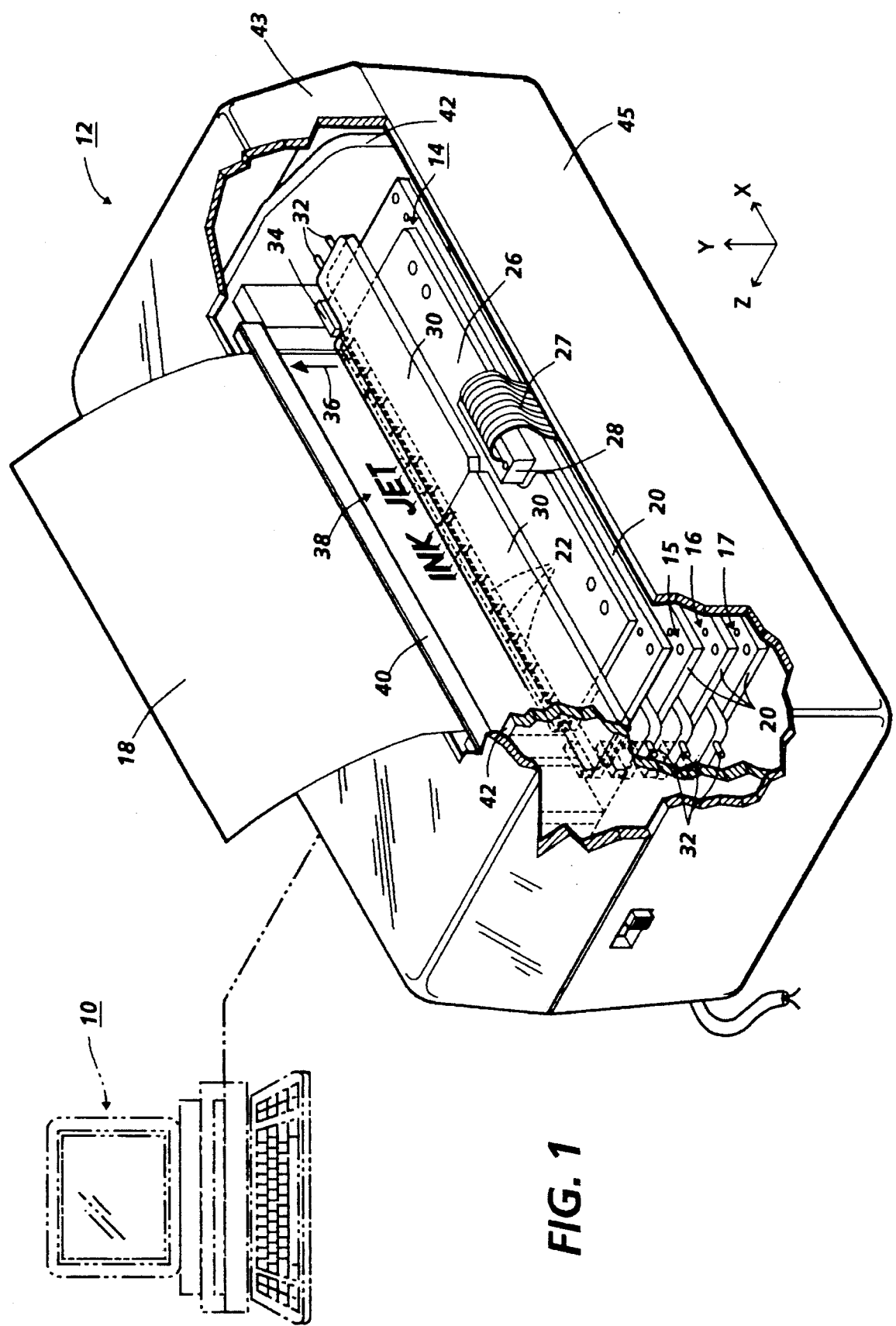
FIG. 1 is a partially shown, isometric view of a multicolor, full width array ink jet printer.

In FIG. 1, multicolor ink jet printer 12 is illustrated with four identical full width array printheads 14, 15, 16, and 17, disposed therein to produce printed output or images on a recording medium, such as sheet 18. The printheads each comprise a structurally supporting substrate 20 which also functions as a heat sink and may optionally be cooled by the passage of a liquid coolant, such as water, through internal flow paths (not shown). An array of printhead subunits 22 are affixed on the supporting substrate 20 in an abutted fashion, as taught by U.S. Pat. No. 5,198,054 to Drake et al. and incorporated herein by reference. Alternatively, individual subunits 22 may be spaced apart from one another by a distance approximately equal to the length of a single subunit and bonded to each opposing surface of a supporting substrate 20, the subunits on one surface being staggered from the subunits on the other surface of the supporting substrate. In one embodiment, subunits 22 may be similar in construction to U.S. Pat. No. 4,774,530 to Hawkins, the relevant portions of which are hereby incorporated by reference. The forward facing edges of the subunits contain the droplet ejecting nozzles 23 and are referred to as printhead subunit faces 24 (See FIG. 2). The subunit faces 24 are maintained in close proximity to the surface of recording medium or sheet 18. Also affixed to substrate 20, at a position behind the abutted subunit array, is printed wiring board 26. Printed wiring board 26 contains the circuitry required to interface and drive the individual heating elements (not shown) in the subunits to eject ink droplets from the nozzles 23. While not shown in FIG. 1, printed wiring board 26 is connected to individual contacts contained on the subunits via a commonly known wire bonding technique (See FIG. 7). The data required to drive the individual heating elements of the printhead subunits is supplied from an external system by a standard printer interface, modified and/or buffered by a printer micro processor (not shown) within the printer and transferred to the printheads 14, 15, 16, and 17 by ribbon cables 27, only one of which is shown, and pin-type connector 28.

Figure 2:
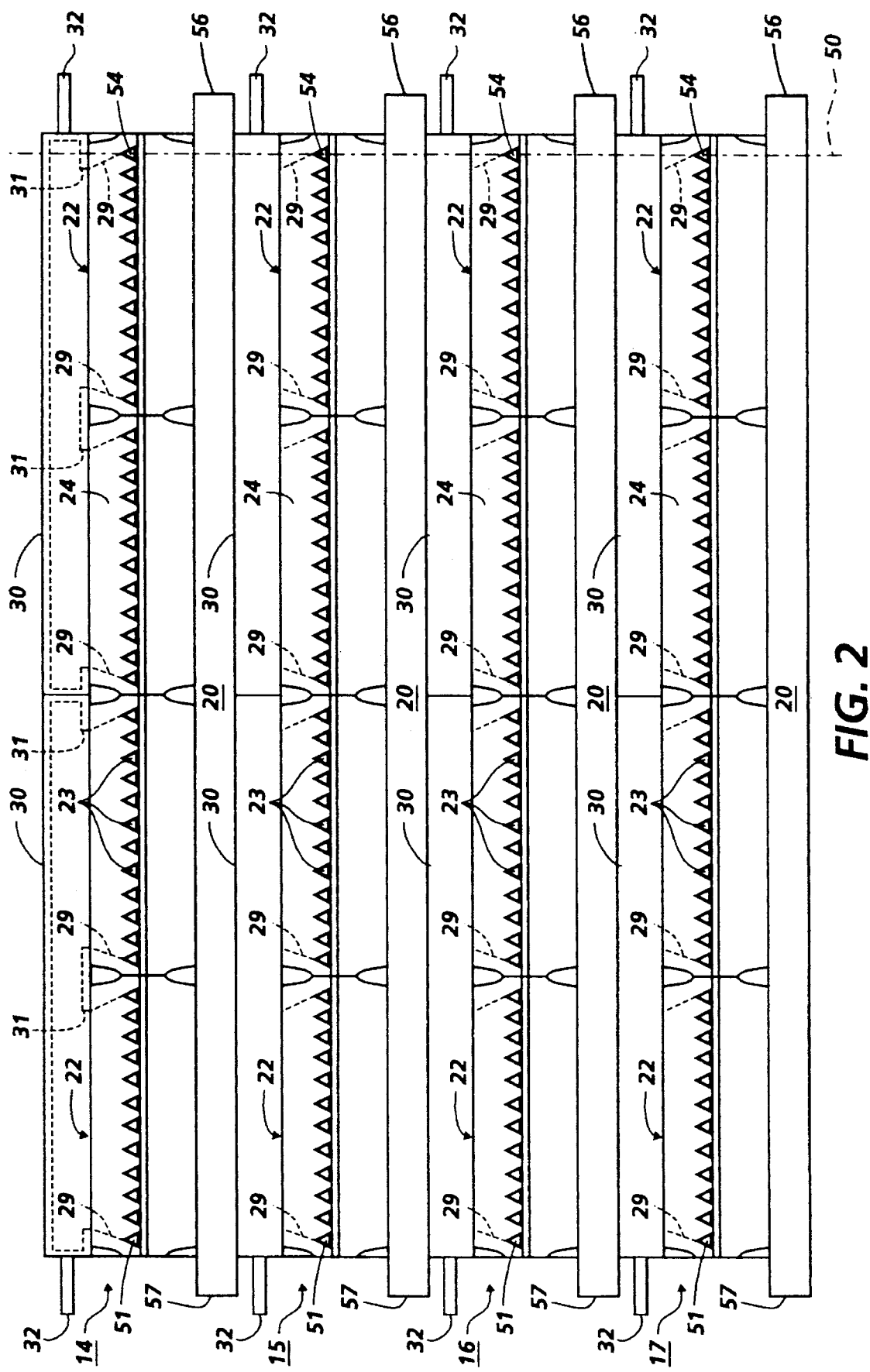
FIG. 2 is an enlarged, schematic front elevation view of four typical printbars of the printer in FIG. 1.

Ink is supplied to the individual subunit nozzles 23 of FIG. 2 through ink channels (not shown) which connect the nozzles to subunit reservoirs 29. The subunit reservoirs 29 have inlets 25 which are aligned and sealed with outlets 31 in ink manifolds 30. Further description of such an arrangement may be found in U.S. Pat. No. 4,929,324 to Drake et al., the relevant portions of which are hereby incorporated by reference. Ink is supplied to the manifold inlet connectors 32 to which flexible hoses (not shown) connect an ink supply (not shown) located within the printer 12. Also affixed to the surface of substrate 20 are locating or alignment pads 34 (See FIG. 1) which are used to accurately position the full width array printheads or printbars within the printer 12. Further description of alignment pads 34 and the locating reference points (not shown) in the printer may be found in U.S. Pat. No. 5,192,959 to Drake et al., the relevant portions of which are hereby incorporated by reference. The location of full width array printbars 14, 15, 16, and 17 is particularly important in order to accurately position the nozzles of abutted printhead subunits 22 comprising each full width array printbar, because multicolor printing requires accurate placement of the ink droplets from each printbar relative to one another in order to place one ink droplet on a previously ejected droplet on the recording medium 18, thereby achieving the desired final colored image.

As further illustrated in FIG. 1, recording medium 18 is fed in the direction of arrow 36 as ink droplets are ejected from the nozzles in subunit face 24 of subunits 22 to produce output images 38 thereon. The paper is fed by conventional paper feeding mechanisms (not shown) and is maintained in close proximity to the subunit face of the subunits 22 making up the various full width array printbars by one or more paper guides 40 which may contain several idler star wheels (not shown) therein. The spacing between the front faces 24, which are all coplanar with one another, and the surface of the recording medium 18, commonly referred to as the Z-direction, is important to control the position of the ink droplets ejected from the individual nozzles. Furthermore, the spacing between the parallel and adjacent full width array printbars 14, 15, 16, and 17 must be maintained as close as possible and within very close tolerances, as discussed later with reference to FIG. 2.

Printer 12 also includes a pair of rigid frame members 42 which provide mechanisms, such as reference points (not shown) for receiving the alignment pads 34 and for aligned attachment of the supporting substrates 20 of each of the full width array printbars 14, 15, 16, and 17. Frame members 42 additionally provide support and for attachment of maintenance stations 44 for each of the full width array printbars located behind the recording medium and shown in FIG. 7. The previously described elements of printer 12 are generally enclosed within upper and lower covers 43 and 45, respectively.

In FIG. 2, an enlarged, schematic front view of the four, full width array printheads or printbars 14, 15, 16, and 17 are shown, each printbar being depicted as having only four printhead subunits 22 for clarity of explanation, though many more would be needed in an actual printbar. One printbar is required for each of the three primary colors, viz., cyan, magenta, and yellow, and the fourth printbar is for black ink. Precision alignment of the printbars is necessary because both black-on-black and multicolor printing involve several different printbars sequentially propelling ink droplets on the same target points or pixel locations on the recording medium 18. Dashed line 50 represents the predetermined acceptable overall distance for the last nozzle 54 in each of the printhead subunits 22 which are located in the last position in each printbar from a location point, such as the end 57 of supporting substrate 20, which is opposite the supporting substrate end 56 that is closer to the last nozzle 54. This end 57 of each supporting substrate 20 of the printbars is then mounted on and referenced against frame members 42 through reference points (not shown) of the multicolor printer 12 as disclosed in U.S. Pat. No. 5,192,959 and U.S. Pat. No. 5,198,054. Other location points could be used, such as, the first nozzle 51 in the printhead subunit 22 located in the first position nearer supporting substrate end 57. The last nozzle of each printhead subunit in the last position in each printbar must fall on dashed line 50 or within its predetermined overall tolerance range of plus or minus 10 µm. If the ink jets or nozzles do not line up closely enough, the mixed color images will be indistinct. When printbars are assembled in accordance with the assembly procedure of U.S. Pat. No. 5,198,054, incorporated herein by reference, and the last nozzles 54 are aligned with dashed line 50, each of the nozzles in one printbar are aligned within the appropriate tolerances to provide dot-on-dot high quality printing.

Figure 3:
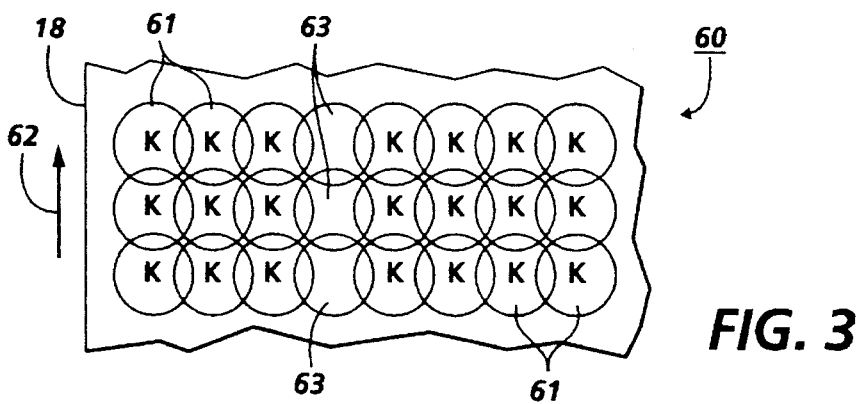
FIG. 3 is a pixel image printed by the printbar for black ink and showing the results of a defective nozzle.
Figure 4:
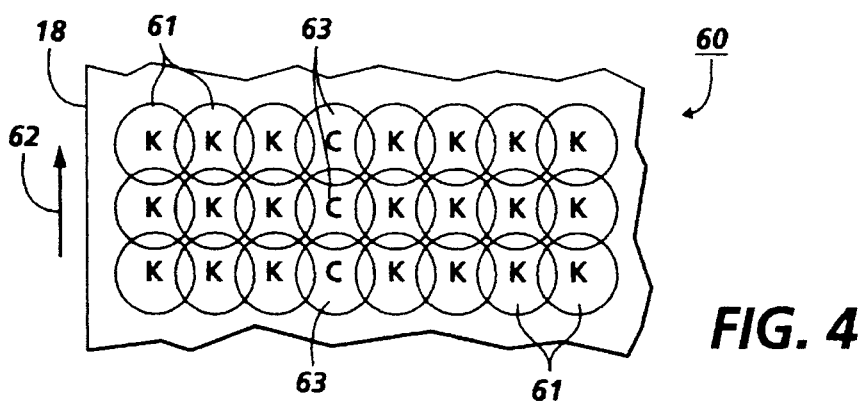
FIG. 4–6 are pixel images printed by the method of the present invention to improve the pixel image of FIG. 3.

FIG. 3 shows the pixel image 60 printed by the printbar 17 having black ink, as the recording medium 18 moves thereby in the direction of arrow 62. All of the pixels 61 received an ink droplet of black ink as indicated by the letter "K" which represents black, except the vertical column of pixels 63 which were not printed because the nozzle for this column of pixels was clogged, malfunctioned, or failed. In accordance with the present invention, the nozzle that did not or could not print the pixels 63 was identified, by means discussed later, and a nozzle in another printbar aligned with the problem or failed nozzle in the printbar 17 for black ink ejected droplets for the pixels 63, such as, printbar 14 which ejects cyan ink droplets, identified as "C" pixels. Thus, the blank or unprinted black pixels 63 have been printed with cyan ink droplets as shown in FIG. 4.

Figure 5:
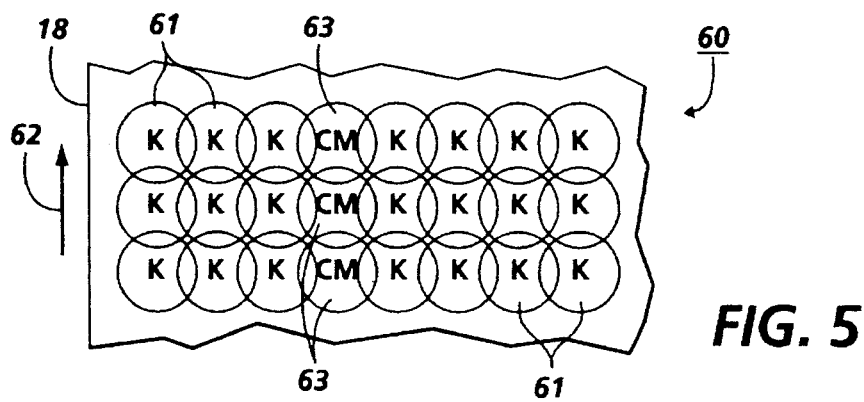
Figure 6:
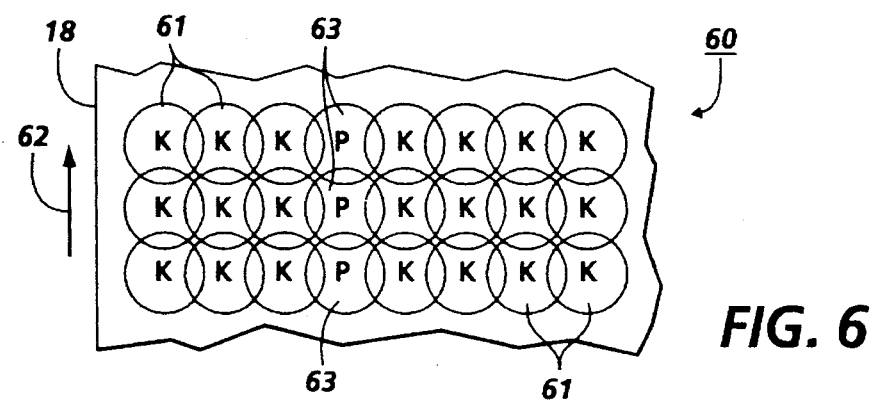

FIG. 5 depicts the blank or unprinted pixels 63 printed by droplet-on-droplet of cyan ink and magenta ink from printbars 14 and 15, respectively, as presented by "CM", where "C" means cyan and "M" means magenta. FIG. 6 is similar to FIG. 5, except it has a third droplet of yellow ink from printer 16 printed on top of the droplet-on-droplet of CM to produce process black ink as indicated by "P". The printed images 60 in FIGS. 4–6 each represent an improvement on the image 60 of FIG. 3 which has a missing column of printed pixels with cyan, cyan and magenta, or with process black ink, the image quality is so improved that the printbar 17 for printing black does not have to be replaced, for the missing printed pixels are substantially undetectable by the unaided eye; especially when only one or two nozzles fail out of the many in a full width array printbar.

The failed nozzles in the black printbar may be detected by observing the printed recording medium 18. The failed nozzles could be identified by measuring the distance of the blank pixels from one edge of the recording medium, and these missing nozzles could be identified by, for example, a personal computer 10 plugged into the printer 12, as shown in phantom line in FIG. 1, thereby enabling the printer's microprocessor to implement preprogrammed algorithms to accomplish the replacement of the missing black pixels with cyan, cyan and magenta, or process black as discussed above with respect to FIGS. 3–6.

Though this invention has been described in terms of a black ink printing printbar, the same process is used for a cyan or magenta ink printing printbar which has one or two failed or malfunctioning nozzles. In this case, the missing cyan or magenta droplet will be replaced by a black ink droplet, using the process described above with respect to a missing black ink droplet. A missing yellow ink droplet has been found to be less of a problem than with the other color of inks and, therefore, a missing yellow ink droplet is not replaced with another color of ink.

In another embodiment, the missing or failed nozzles are automatically identified by electronic detection of electrically failed heating elements or by the electronic detection of air inside the individual printhead subunits 22 as disclosed in U.S. Pat. No. 5,072,235 to Slowik et al. and incorporated herein by reference.

Figure 7:
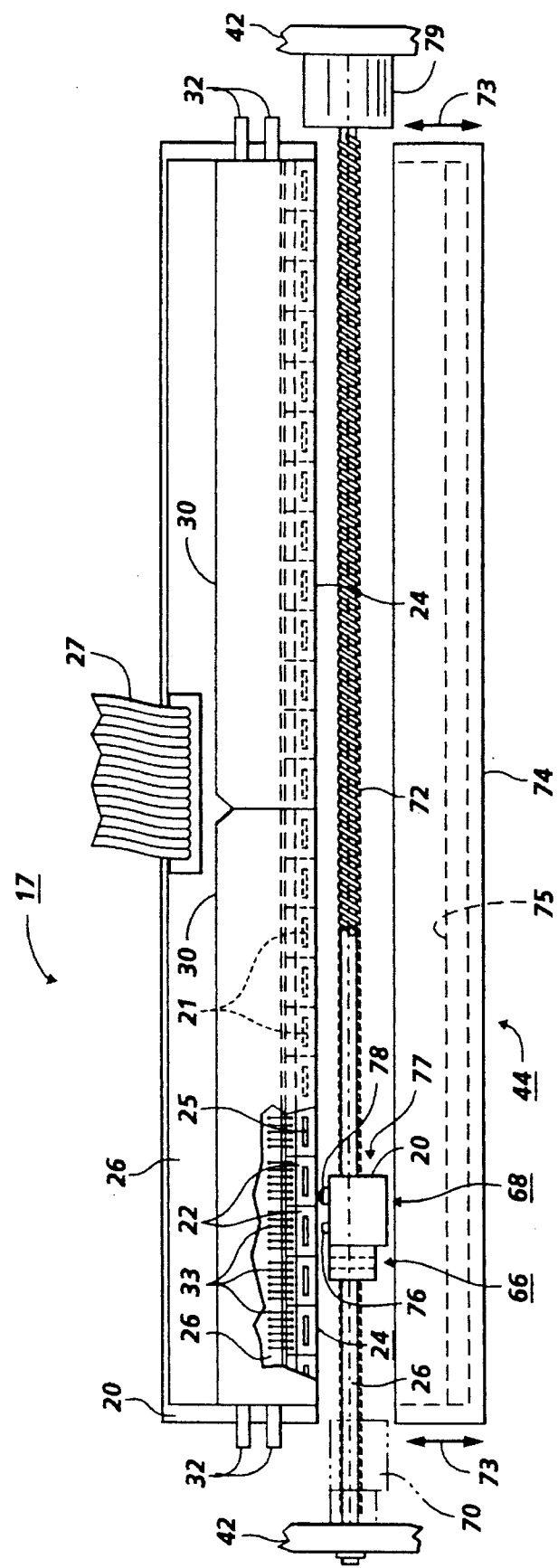
FIG. 7 is a maintenance station located behind the paper path of the printer and shows the droplet sensor and nozzle cleaner for each full width array printbar.

In yet another embodiment, the failed or malfunctioning nozzles 23 in the printhead subunits 22 of printbar 17 are detected by the droplet sensor 66 attached to the recovery device 68 of the maintenance station 44 located behind the recording medium 18 in the printer 12, as shown in FIG. 7. The maintenance station 44 is similar to the one disclosed in copending application Ser. No. 08/322,129, entitled "Drop Sensing and Recovery System For an Ink Jet Printer" filed Oct. 10, 1994, to David G. Anderson, et al. and assigned to the same assignee as this case. Each printbar has a maintenance station all identical to the one in FIG. 7 described for the printbar 17 which ejects black ink droplets. FIG. 7 is a partially shown plan view of the printbar 17 with the recording medium removed, so that the droplet sensor 66 and recovery device 68 mounted on carriage 69 may be moved from their normally stored location 70 shown in dashed line, and transported on guide rail 71 and lead screw 72 to traverse across the printhead subunit faces 24 in a direction parallel therewith. When the droplet sensor and recovery device are stored at location 70, and the printbars are not printing, a movable cap 74 may be moved in the direction of arrows 73 to seal the printbar nozzles or to a spaced location to permit printing or the use of the droplet sensor and recovery device. Absorbent pad 75 in the cap 74 is filled with ink or other liquid such as water to provide humidity for the cap 74 when it is sealed against the printbar face 24. The printbar 17, as discussed earlier, is assembled from printhead subunits 22 into a linear array of subunits mounted end-to-end on supporting substrate 20. The supporting substrate not only provides the structural integrity for the printbar 17, but also is a means of heat management, since it readily conducts and dissipates heat.

Printed wiring board 26 is bonded to the supporting substrate 20 adjacent the linear array of printhead subunits 22 and connected thereto by wire bonds 33. To print the required information by ejection of ink droplets from the nozzles of the subunits, a printer controller or microprocessor (not shown) controls electrical pulses to the heating elements (not shown) in ink channels (not shown), which connect the printhead subunit reservoirs with inlets 25 to the nozzles in the printbar face 24. The heating elements are individually addressed via the ribbon cable 27, electrodes on the printed wiring board 26, and wire bonds 33 to the driver circuitry (not shown) on each printhead subunit. Ink supply manifolds 30 are mounted over the printhead subunits and printed wiring board with the manifold outlets 31 aligned and sealed with the inlets 25 of the printhead subunits. Each manifold has ink inlets 32 for receipt of ink by flexible hoses (not shown) from ink supplies (not shown) within the printer 12.

The droplet sensor 66 and recovery device 68 are generally positioned in location 70 to one side of the full width array, thereby enabling the passage of recording medium 18 between the guide rail 71 and lead screw 72 for printing or enabling the cap 74 to be sealed against the printhead face 24 and enclose the entire array of nozzles 23 which are in the printhead subunits. The droplet sensor 66 scans across the full width array printbar by the activating of electric motor 79 which rotates the lead screw 72 and each time the droplet sensor is aligned with a nozzle, a droplet is ejected for the sensing thereof. Whenever a droplet is not sensed, the nozzle is identified as a failed or malfunctioning nozzle and the recovery device 68 is used to clean the nozzle and to prime it if necessary. This is accomplished by a vacuum nozzle 76 and a wet wiper 77 of a cleaning solution. The wiper comprises a nozzle with a meniscus 78 of cleaning solution. Whenever the printhead face or nozzle requires cleaning, the cleaning solution in the nozzle is slightly pressurized to bulge the meniscus into contact with the printhead face. Once the nozzles or printhead face is wet with cleaning solution, the vacuum nozzle sucks the cleaning solution and ink or other contaminating particles away. After a recovery attempt which is unsuccessful, the nozzle is identified as a failed nozzle and the nozzles in the other full width array printbars which are aligned with the failed nozzle in the black ink printing printbar 17 are used to print the missing pixels as indicated in the discussion of FIGS. 4–6.

Many modifications and variations are apparent from the foregoing description of the invention, and all such modifications and variations are intended to be within the scope of the present invention. For example, the printbars could be less than a page width in length, and may reciprocated on a carriage rather than being fixed in the color printer.

I claim:

1. A method of extending the life of a printbar in a four printbar having a plurality of nozzle of a multicolor ink jet printer, comprising the steps of:

(a) monitoring each nozzle in each printbar for droplet ejection;

(b) identifying each nozzle in each printbar which does not eject a droplet as a problem nozzle; and (c) ejecting at least one droplet from a nozzle from at least one other printbar aligned with said problem nozzle to replace a missing droplet of ink from the identified problem nozzle in the printbar, so that a pixel on a recording medium not printed because of the missing droplet of ink is filled with a droplet of another color of ink, thereby enabling continued use of the printbar.

2. The method of claim 1, wherein at least one problem nozzle identified in step (b) is in a black ink printing printbar; and wherein missing droplets from the problem nozzle in the black ink printing printbar are replaced by cyan ink droplets from a nozzle in a cyan ink printing printbar which is in alignment with the problem nozzle in the black ink printing printbar.

3. The method of claim 2, wherein the missing droplets from the problem nozzle in the black ink printing printbar which are replaced with cyan ink droplets are additionally overprinted with magenta ink droplets from a magenta ink printing printbar.

4. The method of claim 3, wherein the missing droplets from the problem nozzle in the black ink printing printbar which are replaced with cyan and magenta ink droplets are additionally overprinted with yellow ink droplets from a yellow ink printing printbar to produce a process black ink droplet.

5. The method of claim 1, wherein at least one problem nozzle identified in step (b) is in a cyan ink printing printbar; and wherein missing droplets from the problem nozzle in the cyan ink printing printbar are replaced by black ink droplets from a nozzle in a black ink printing printbar which is in alignment with the problem nozzle in the cyan ink printing printbar.

6. The method of claim 1, wherein at least one problem nozzle identified in step (b) is in a magenta ink printing printbar; and wherein missing droplets from the problem nozzle in the magenta ink printing printbar are replaced by black ink droplets from a nozzle in a black ink printing printbar which is in alignment with the problem nozzle in the magenta ink printing printbar.

7. The method of claim 1, wherein each of the four printbars in the multicolor ink jet printer is a full width array printbar having a length sufficient to extend across the width of a recording medium.

8. The method of claim 1, wherein each of the four printbars in the multicolor ink jet printer is less than a pagewidth in length.

* * * * *